United States Patent [19]
Hester, Jr.

[11] 3,903,103
[45] Sept. 2, 1975

[54] 4-AMINO-S-TRIAZOLO-[4,3-a][1,4] BENZODIAZEPINE
[75] Inventor: Jackson B. Hester, Jr., Galesburg, Mich.
[73] Assignee: The Upjohn Company, Kalamazoo, Mich.
[22] Filed: Jan. 21, 1974
[21] Appl. No.: 434,812

Related U.S. Application Data
[63] Continuation-in-part of Ser. No. 180,876, Sept. 15, 1971, abandoned.

[52] U.S. Cl. .................... 260/308 R; 260/239 BD; 260/239.3 D; 260/283 R; 260/288 R; 260/289 R; 260/562 B; 424/269
[51] Int. Cl.² .............. C07D 243/20; C07D 487/04
[58] Field of Search ................................ 260/308 R

[56] References Cited
UNITED STATES PATENTS
3,197,467  7/1965  Bell .............................. 260/239.3 D
3,344,136  9/1967  Bell et al. ...................... 260/239.3 D FOREIGN PATENTS OR APPLICATIONS
6,916,543  5/1970  Netherlands .................... 260/308
2,010,884  12/1970  Germany ......................... 260/308

OTHER PUBLICATIONS
Bell et al. II, J. Med. Pharm. Chem., Vol. 11, pages 457 – 461, (1968).

Primary Examiner—Alton D. Rollins
Attorney, Agent, or Firm—Hans L. Berneis

[57] ABSTRACT
4-Amino-s-triazolo[4,3-a][1,4]benzodiazepines of the formula IIIa:

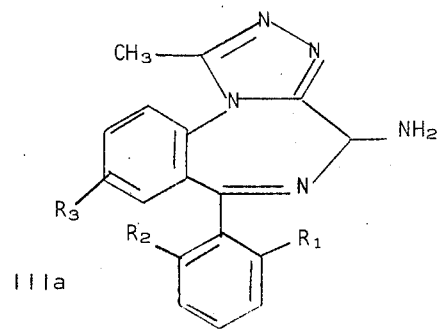

IIIa wherein $R_1$ is hydrogen, chloro of fluoro; wherein $R_2$ is hydrogen, or fluoro with the proviso that $R_2$ is fluoro only if $R_1$ is fluoro, and wherein $R_3$ is chloro, fluoro, nitro or trifluoromethyl, are prepared by reacting an s-triazolo[4,3-a][1,4]benzodiazepine-4-carboxylic acid ester (1) with O-(2,4-dinitrophenyl)-hydroxylamine and thereafter hydrolyzing and decarboxylating the product with barium hydroxide to give the compound IIIa.

The invention further comprises the amides products from these amines and the pharmacologically acceptable acid addition salts thereof.

The above products are useful sedatives and tranquilizers for mammals.

5 Claims, No Drawings

4-AMINO-S-TRIAZOLO-[4,3-a][1,4]BENZODIAZEPINE

CROSS REFERENCE TO RELATED APPLICATION

This application is a Continuation-in-Part of application Ser. No. 180,876, filed Sept. 15, 1971 and now abandoned.

BACKGROUND OF THE INVENTION

Field of the Invention

This invention is directed to new organic compounds and is particularly concerned with novel 4-amino-6-phenyl-4H-triazolo[4,3-a][1,4]benzodiazepines, intermediates and a process for the production thereof.

The novel compounds and the process of production therefor can be illustratively represented as follows:

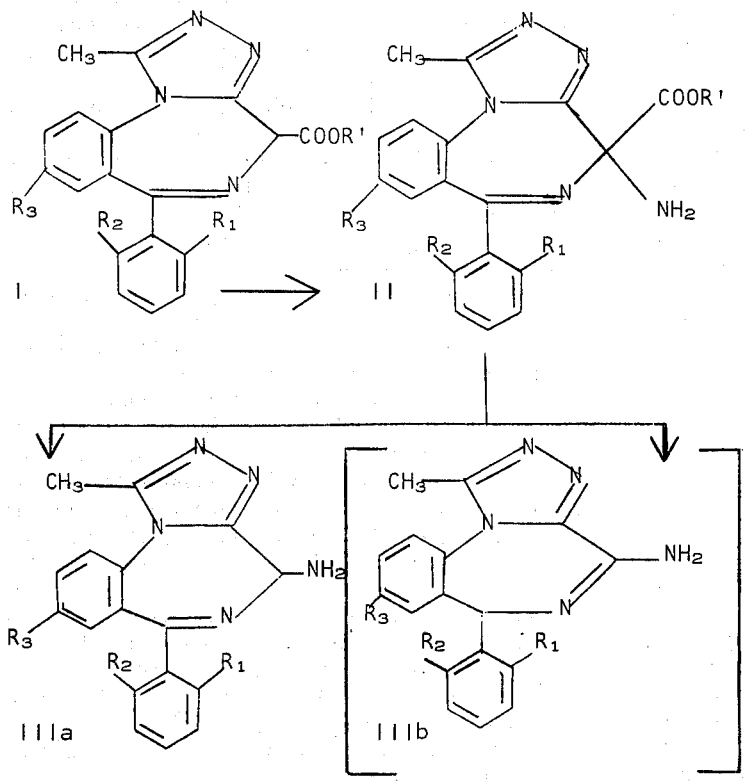

wherein $R_1$ is hydrogen, chloro or fluoro; wherein $R_2$ is hydrogen, or fluoro with the proviso that $R_2$ is fluoro only if $R_1$ is fluoro; and wherein $R_3$ is chloro, fluoro, nitro or trifluoromethyl.

The pharmacologically acceptable acid addition salts of compounds of formula IIa are also comprised by this invention.

The more desirable compounds of this invention are of the formula IIIaa

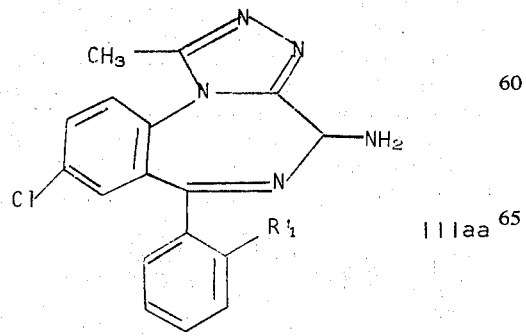

wherein $R'_1$ is hydrogen or chloro, and the pharmacologically acceptable acid addition salts thereof.

The invention also encompasses the N-acyl derivatives of the compounds of formula IIIa and IIIaa.

The process of this invention comprises treating an acid ester of formula $i$ in a solvent with a strong base and then with 0-(2,4-dinitrophenyl)hydroxylamine to obtain the amino ester (II); hydrolyzing II with a base followed by acidification to obtain the free carboxylic acid which decarboxylates spontaneously to give a compound of formula IIIa as well as IIIb. With barium hydroxide followed by sulfuric acid, the principal product is IIIa; with sodium hydroxide and hydrochloric acid the principal product is IIIb, which also has activity as a tranquilizer.

Acylation of the amines IIIa and IIIb with a hydrocarboncarboyxlic acid anhydride by conventional procedures gives the corresponding amides.

DESCRIPTION OF THE PREFERRED EMBODIMENT

The acid addition salts of compounds of formula IIIa in this invention, are the hydrochlorides, hydrobromides, hydriodides, sulfates, phosphates, cyclohexanesulfamates, methanesulfonates and the like, prepared by reacting a compound of formula IIIa with an equivalent amount of the selected pharmacologically acceptable acid.

Sedative effects of 4-amino-8-chloro-1-methyl-6-phenyl-4H-s-triazolo[4,3-a][1,4]benzodiazepine are shown by the following tests in mice:

Chimney test: [Med. Exp. 4, 145 (1961)]: The effective intraperitoneal dosage for 50% of the mice ($ED_{50}$) is 6.3 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of the test compound at which 50% of the mice remain in the dish. The $ED_{50}$ (intraperitoneal administration) in this test is 4.5 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 4.5 mg./kg.

Nicotine antagonism test: Mice in a group of 6 are injected with the test compound (4-amino-8-chloro-1-methyl-6-phenyl-4H-s-triazolo[4,3-a][1,4] benzodiazepine). Thirty minutes later the mice including control (untreated) mice are injected with nicotine salicylate (2 mg./kg.). The control mice show over-stimulation, i.e., (1) running convulsions followed by (2) tonic extensor fits followed by (3) death. An intraperitoneal dosage of 0.36 mg./kg. of the test compound protected 50% of the mice against (2) and 0.63 mg./kg. against (3) ($ED_{50}$).

The intermediates of formula II are also active tranquilizers and sedatives, but of lesser activity, as can be seen below:

| | $ED_{50}$ (in mg./kg.) | | | |
|---|---|---|---|---|
| | Ch | D | P | Ni |
| 4-amino-8-chloro-methyl-6-phenyl-4H-s-triazolo[4,3-a][1,4]benzodiazepine-4-carboxylic acid ethyl ester | 71 | 32 | 25 | 4.5 |

Ch = Chimney test
D = Dish test
P = Pedestal test
Ni = Nicotine test (3)

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose, proteins, lipids, calcium phosphate, cornstarch, stearic acid, methylcellulose, and the like may be used as carriers or for coating purposes. Water and oil, e.g., coconut oil, sesame oil, safflower oil, cottonseed oil, peanut oil, may be used for preparing solutions or suspensions of the active drug. Sweetening, coloring and flavoring agents may be added.

For mammals and birds, food premixes, with starch, oatmeal, dried fishmeat, fishmeal, flour and the like can be prepared.

As tranquilizers, the compounds of formula IIIa and IIIb can be used in dosages of 0.2–20 mg./kg., preferably 1–10 mg./kg., in oral or injectable preparations as described above, to alleviate tension and anxiety in mammals, or birds, such as e.g., occurs when animals are in travel. Particularly for larger animals the low dosage range is preferable.

Feeds for poultry or livestock can be prepared containing from 1–100 grams of IIIa or salts thereof per ton of feed, to achieve faster growth, greater food efficiency, weight gain, and higher production of eggs or milk.

The starting products of this invention (formula I) are produced as shown in the preparations.

In carrying out the process of this invention, an ester compound I is treated in solution with a strong base. As solvent for the solution dimethylformamide, diethylformamide, dimethylsulfoxide, diethylsulfoxide, dioxane, diglyme, tetrahydrofuran, and the like, can be used. As base as alkali metal alkoxide or hydride is used, e.g., sodium or potassium methoxide, ethoxide, potassium or sodium hydride or the like. In the preferred embodiment of this invention the reaction with the base is carried out at −10° to 20° C. over a period of 5–30 minutes. The mixture may be allowed to stand at room temperature (20°–30° C.) for ½ to 3 hours and is then cooled to −10° to 15° C. before adding the 0-(2,4-dinitrophenyl) hydroxylamine. An excess of 5–20% (molar ratios) of the reactant hydroxylamine over the starting compound is preferred. The reaction mixture again is allowed to stand for ½ to 3 hours. At the termination of the reaction, compound II is isolated and purified by standard methods such as extraction, chromatography, crystallization and the like.

Compound II is then simultaneously hydrolyzed and decarboxylated. Treating II with one-third N aqueous barium hydroxide in a solvent, e.g. a lower alkanol at room temperature and neutralizing the mixture with dilute sulfuric acid gave compound IIIa. Treating II with an elevated concentration of a base, e.g., sodium or potassium hydroxide from (1N to 5N), and neutralizing with hydrochloric acid gave mainly compound IIIb.

The treatment of II with a base is preferably carried out at room temperature during ½ to 3 hours, in methanol, ethanol, or 1- or 2-propanol. The treatment (neutralization) of the resulting salt solution with a mineral acid e.g. hydrochloric, hydrobromic, sulfuric acid, and the like requires only minutes. Conventional means are used to isolate the product IIIa or IIIb such as removing salts e.g. barium sulfate by filtration or extraction, followed by chromatography, recrystallization, and the like.

Treatment of IIIa with an acid halide e.g. acetyl chloride, in pyridine or with an acid anhydride gives the corresponding amides which are isolated by conventional means, evaporation of solvents, extraction, chromatography, crystallization, and the like.

The following Preparations and Examples are illustrative of the process and products of the present invention but are not to be construed as limiting.

PREPARATION 1

2'-Benzoyl-4'-chloroacetanilide

Acetyl chloride (81.3 g., 1.037 mole) was added to a stirred solution of 2-amino-5-chlorobenzophenone (200.0 g., 0.864 mole) and pyridine (68.4 g., 0.864 mole) in dry ether (4.1.); the mixture was kept at ambient temperature for 2 hours and treated with 500 ml. of water. The layers were separated and the ether layer was dried over anhydrous sodium sulfate and concentrated. Crystallization of the residue from ethyl acetate-Skellysolve B hexanes gave: 124.0 g. of 2'-benzoyl-4'-chloroacetanilide of melting point 114°–115° C. Two more crops of 2'-benzoyl-4'-chloroacetanilide also were obtained: 67.8 g. of melting point 113.5°–114.5° C. and 33.0 g. of melting point 113°–114° C.

PREPARATION 2

6-chloro-4-phenyl-2(1H)-quinolone

The procedure (reaction of 2'-benzoyl-5'- chloroacetanilide with sodium hydroxide) of A. E. Drukker and C. I. Judd, J., Heterocyclic Chem. 3, 359 (1966) was used for this preparation. The yield was 77%. Two other preparations have been described: S. C. Bell, I. S. Sulkowski, C. Gochman and S. J. Childress, J. Org. Chem. 27, 562 (1962); G. A. Reynolds and C. R. Hauser, J. Amer. Chem. Soc., 72, 1852 (1950).

PREPARATION 3

2,6-Dichloro-4-phenylquinoline

The procedure of A. E. Drukker and C. I. Judd, J. Heterocyclic Chem. 3, 359 (1966) was used for this preparation. The yield was 62%.

PREPARATION 4

6-Chloro-2-hydrazino-4-phenylquinoline

A stirred mixture of 2,6-dichloro-4-phenylquinoline (2.7 g., 0.01 mole) and hydrazine hydrate (6.8 g.) was refluxed under nitrogen for 1 hour and concentrated in vacuo. The residue was suspended in warm water, and the solid was collected by filtration, dried and recrystallized from ethyl acetate-Skelly B hexanes to give 1.81 g. (67% yield) of 6-chloro-2-hydrazino-4-phenylquinoline of melting point 156.5°–157° C.

Anal. calcd. for $C_{15}H_{12}ClN_3$:
    C, 66.79; H, 4.49; Cl, 13.15; N, 15.58.
Found: C, 67.15; H, 4.65; Cl, 13.19; N, 15.32.

PREPARATION 5

7-Chloro-1-methyl-5-phenyl-s-triazolo[4,3-a]quinoline

A stirred mixture of 6-chloro-2-hydrazino-4-phenylquinoline (1.4 g., 0.0052 mole), triethyl orthoacetate (0.925 g., 0.0057 mole) and xylene (100 ml.) was refluxed under nitrogen, for 2 hours, 40 minutes. During this period the ethanol formed in the reaction was removed by distillation through a short, glass helix-packed column. The mixture was concentrated to dryness in vacuo and the residue was crystallized from methanol-ethyl acetate to give: 1.02 g. of 7-chloro-1-methyl-5-phenyl-triazolo [4,3-a]-quinoline of melting point 253.5°–225° C. and 0.26 g. of melting point 253.5°–255° C. (83.9% yield). The analytical sample was crystallized from methylene chloride; methanol and had a melting point 252.5°–253.5° C.

Anal. calcd. for $C_{17}H_{12}ClN_3$:
    C, 69.50; H, 4.12; Cl, 12.07; N, 14.31.
    C, 69.39; H, 4.02; Cl, 12.10; N, 14.49.

PREPARATION 6

5-Chloro-2-(3-methyl-4H-1,2,4-triazol-4-yl)benzophenone (Oxidation of 7-chloro-1-methyl-5-phenyl-s-triazolo[4,3-a]quinoline)

A stirred suspension of 7-chloro-1-methyl-5-phenyl-s-triazolo [4,3-a]quinoline (2.94 g., 0.01 mole) in acetone (110 ml.) was cooled in an ice-bath and treated slowly with a solution prepared by adding sodium periodate (2 g.) to a stirred suspension of ruthenium dioxide (200 mg.) in water (35 ml.). The mixture became dark. Additional sodium periodate (8 g.) was added during the next 15 minutes. The ice bath was removed and the mixture was stirred for 45 minutes. Additional sodium periodate (4 g.) was added and the mixtures was stirred at ambient temperature for 18 hours and filtered. The solid was washed with acetone and the combined filtrate was concentrated in vacuo. The residue was suspended in water and extracted with methylene chloride. The extract was dried over anhydrous potassium carbonate and concentrated. The residue was chromatographed on silica gel (100 g.) with 10% of methanol 90% ethyl acetate; 50-ml. fractions were collected. The product was eluted in fractions 10–20 and was crystallized from ethyl acetate to give: 0.405 g. of melting point 168°–169.5° C. and 0.291 g. of melting point 167.5°–169° (23.4% yield) 0f 5-chloro-2-(3-methyl-4H-1,2,4-triazol-4-yl)benzophenone. The analytical sample had a melting point of 168° C.

Anal. calcd.    for $C_{16}H_{12}ClN_3O$:
                C, 64.54; H, 4.06; Cl, 11.91; N, 14.11.
Found: .    C, 64.56; H, 4.35; Cl, 11.97; 11.93; N, 14.29.

PREPARATION 7

Oxidation of 7-chloro-1-methyl-5-phenyl-s-triazolo[4,3-a]quinoline

A stirred suspension of 7-chloro-1-methyl-5-phenyl-s-triazolo[4,3-a]quinoline (2.94 g., 0.01 mole) and acetone (200 ml.) was cooled in an ice bath and treated, dropwise, during 15 minutes with a solution prepared from ruthenium dioxide (200 mg.), sodium periodate (4 g.) and water (35 ml.). A slight exothermic reaction was noted and the mixture became dark. After 10 minutes, 29 ml. of a solution of sodium periodate (12 g.) in water (70 ml.) was added during 10 minutes. This mixture was stirred for 2 hours and then the remaining sodium periodate solution (41 ml.) was added during the next 3 hours. The mixture was concentrated in vacuo to remove acetone. The resulting aqueous mixture was extracted with methylene chloride. The extract was washed with water, dried over anhydrous magnesium sulfate, and concentrated. The residue was chromatographed on silica gel (150 g.) with 2% methanol-98% chloroform; 60 ml. fractions were collected. Recovered starting material was eluted in fractions 11–14 and crystallized from methanol-methylene chloride to give 0.069 g. of melting point 251.5°–253.5° C. A mixture of the two products was eluted in fractions 15-39. Crystallization of this mixture from ethyl acetate gave 618 mg. (20.8%) of 5-chloro-2-(3-methyl-4H-1,2,4-triazol-4-yl)benzophenone of melting point 165.5°–168°. Crystallization of the mother liquor from methanol gave 0.126 g., melting point 108–112 and 0.588 g. of melting point 101.5°–105.5° (decomposition) (19.9% yield) of a methanol solvate of 4-(2-benzoyl-4-chlorophenyl)-5-methyl-4H-1,2,4-triazole-3-carboxaldehyde. The analytical sample had a melting point 100°–101.5° C.

Anal. Calcd. for $C_{17}H_{12}ClN_3O_2$:
    C, 62.68; H, 3.71; Cl, 10.89; N, 12.90.
    Found: C, 59.37; H, 4.89; Cl, 9.75; N, 11.30.

MeOH, 9.34%; H$_2$O, 0.40%. Corrected for MeOH and H$_2$O: C, 61.90; H, 4.06; Cl, 10.80; N, 12.52.

Heating the solvate in a desiccator at 70° C. at 15 mm. Hg for 72 hours gave pure 4-(2-benzoyl-4-chlorophenyl)-5-methyl-4H-1,2,4-triazole-3-carboxaldehyde.

PREPARATION 8

Oxidation of 7-chloro-1-methyl-5-phenyl-s-triazolo[4,3-a]quinoline

A vigorous stream of ozone in oxygen was bubbled for 12 hours, into a stirred, ice-cold solution of 7-chloro-1-methyl-5-phenyl-s-triazolo[4,3-a]quinoline (31.1 g., 0.106 mole) in methanol (750 ml.) and methylene chloride (500 ml.). The resulting mixture was filtered and the filtrate was added to an ice cold solution of sodium iodide (47.5 g.) and acetic acid (63 ml.) in water (200 ml.). The solution was decolorized by the addition of sodium thiosulfate and concentrated in vacuo. The residue was mixed with water and extracted with methylene chloride. The extract was washed (H$_2$O), dried over anhydrous magnesium sulfate and concentrated. The residue was chromatographed on silica gel (1.5 kg.); 175 ml. fractions were collected. Fractions 1–128 were eluted with 1% methanol -99% chloroform and fractions 129–168 with 5% methanol-95% chloroform. The first compound was eluted in fractions 49-60 and crystallized from methanol-ethyl acetate to give: 0.769 g. of melting point 229.5°–231° (decomposition) and 0.535 g. of melting point 228° (decomposition) of 7-chloro-1-methyl-5-phenyl-s-triazolo[4,3-a]quinolin-4(5H)-one. The analytical sample has a melting point 232°–233° C.

Anal. calcd. for C$_{17}$H$_{12}$ClN$_3$O:
C, 65.92; H, 3.91; Cl, 11.44; N, 13.57.
Found: C, 65.46; H, 3.72; Cl, 11.48; N, 13.59.

Recovered starting material was eluted in fractions 66–78 and crystallized from methylene chloride-methanol to give 0.737 g. of melting point 251°–253.5° C. A mixture of the two remaining products was eluted in fractions 73–168. Crystallization of this mixture from ethyl acetate gave: 10.8 g. of melting point 166.5°–167.5° C., 0.987 g. of melting point 166°–167° C. and 2.52 g. of melting point 164°–165.5° C. (45.3% yield) of 5-chloro-2-(3-methyl-4H-1,2,4-triazol-4-yl)benzophenone. Crystallization of the mother liquor from methanol gave 5.62 g. of melting point 140°–141.5° C., 1.23 g. of melting point 100.5°–102.5° (decomposition) and 1.04 g. of melting point 105-137.5° (20.8% yield) of 4-(2-benzoyl-4-chlorophenyl)-5-methyl-4H-1,2,4-triazole-3-carboxaldehyde.

PREPARATION 9

5-Chloro-2-[3-(hydroxymethyl)-5-methyl-4H-1,2,4-triazol-4-yl]benzophenone.

A stirred mixture of 5-chloro-2-(3-methyl-4H-1,2,4-triazolo-4-yl]nenzophenone, (2.98 g., 0.01 mole) paraformaldehyde (3 g.) and xylene (100 ml.) was warmed under nitrogen, in a bath maintained at 125° C. for 7 hours. The mixture was then concentrated in vacuo. The residue was chromatographed on silica gel (150 g.) with 3% methanol-97% chloroform. Fifty ml. fractions were collected. The product was eluted in fractions 20–44. The fractions were concentrated and the residue was crystallized from ethanol-ethyl acetate to give: 1.64 g. of melting point 138°–142° C.; 0.316 g. of melting point 138.5°–141° C.; 0.431 g. of melting point 139°–141° C. (72.8% yield) of 5-chloro-2-[3-(hydroxymethyl)-5-methyl-4H-1,2,4-triazol-4-yl]benzophenone. The analytical sample had a melting point of 138°–139° C.

Anal. calcd. for C$_{17}$H$_{14}$ClN$_3$O$_2$:
C, 62.30; H, 4.30; Cl, 10.81; N, 12.82.
Found: C, 62.23; H, 4.22; Cl, 10.82; N, 11.73.

PREPARATION 10

5-Chloro-2-[3-(bromomethyl)-5-methyl-4H-1,2,4-triazol-4-yl]benzophenone

A solution of 5-chloro-2-[3-(hydroxymethyl)-5-methyl-4H-1,2,4-triazol-4-yl]benzophenone (328 mg., 0.001 mole) in dry, hydrocarbon-stabilized chloroform (5 ml.) was cooled in an ice bath and treated with phosphorus tribromide (0.1 ml.). The colorless solution was kept in the ice bath for 55 minutes, at ambient temperature (22°–24° C.), for 5 hours. The resulting yellow solution was poured into a mixture of ice and dilute sodium bicarbonate. This mixture was extracted with chloroform. The extract was washed with brine, dried over anhydrous magnesium sulfate and concentrated. The residue was crystallized from methylene chloride-ethyl acetate to give: 0.285 g. of melting point 200°–240° (decomposition) and 0.030 g. of melting point 200°–240° C. (decomposition) of 5-chloro-2-[3-(bromomethyl)-5-methyl-4H-1,2,4-triazol-4-yl]benzophenone. The analytical sample had a melting point of 200°–240° C.

Anal. calcd. for C$_{17}$H$_{13}$BrClN$_3$O:
C, 52.26; H, 3.35; Br, 20.46; Cl, 9.08; N, 10.76.
Found: C, 52.13; 52.45; H, 3.77, 3.66; Br, 20.44; Cl, 9.20; N, 10.43.

PREPARATION 11

5-Chloro-2-[3-(chloromethyl)-5-methyl-4H-1,2,4-triazol-4-yl]benzophenone

A solution of 5-chloro-2-[3-(hydroxymethyl)-5-methyl-4H-1,2,4-triazol-4-yl]benzophenone (328 mg., 0.001 mole) in thionyl chloride (2 ml.) was warmed during 40 minutes to a bath temperature of 78° C. and kept at 78°–83° C. for 1 hour 25 minutes. It was then cooled and poured into ice water. This mixture was neutralized with sodium bicarbonate and extracted with chloroform. The extract was washed with brine, dried over anhydrous magnesium sulfate and concentrated in vacuo. The residue was crystallized from ethyl acetate Skellysolve B hexanes to give: 0.240 g. of melting point 144.5°–147° C. and 0.045 g. of melting point 144.5°–146.5° C. of 5-chloro-2-[3-(chloromethyl)-5-methyl-4H-1,2,4-triazol-4-yl]benzophenone. The analytical sample had a melting point of 139°–140° C.

Anal. calcd. for C$_{17}$H$_{13}$Cl$_2$N$_3$O:
C, 58.96; H, 3.78; Cl, 20.48; N, 12.14.
Found: C, 59.22; H, 3.80; Cl, 20.66; N, 11.91.

PREPARATION 12

5Chloro-2-[3-(iodomethyl)-5-methyl-4H-1,2,4-triazol-4-yl]benzophenone

5-Chloro-2-[3-(chloromethyl-5-methyl-4H-1,2,4-triazol-4-yl]benzophonone (346 mg. 0.001 mole) was added to a stirred solution of sodium iodide (300 mg., 0.002 mole) in acetone, and the resulting mixture was stirred at ambient temperature for 6 hours 54 minutes and poured into ice water. This mixture was extracted with chloroform. The extract was wahed with brine, dried and concentrated. The residue was crystallized from methylene chloride-ethyl acetate to give: 0.227 g. of melting point 185.5°–192° C. (decomposition) of 5-chloro-2-[3-(iodomethyl)-5-methyl-4H-1,2,4-triazol-4-yl]benzophenone. The analytical sample had a melting point of 185°–200° C. (decomposition).

Anal. calcd. for $C_{17}H_{13}ClIN_3O$:
C, 46.65; H, 2.99; Cl, 8.10; I, 29.00; N, 9.60.
Found: C, 46.78; H, 2.88; Cl, 8.59; I, 16.98; N, 9.23.

PREPARATION 13

8-Chloro-1-methyl-6-phenyl-4H-s-triazolo[4,3-a][1,4]benzodiazepine

A stirred suspension of 5-chloro-2-[3-(bromomethyl)-5-methyl-4H-1,2,4-triazol-4-yl]benzophenone (391 mg., 0.001 mole) in tetrahydrofuran (15 ml.) was cooled in an ice bath and treated with a saturated solution of ammonia in methanol (12.5 ml.). The resulting solution was allowed to warm to ambient temperature and stand for 24 hours. It was then concentrated in vacuo. The residue was suspended in water, treated with a little sodium bicarbonate and extracted with methylene chloride. The extract was washed with brine, dried with anhydrous potassium carbonate and concentrated. The residue was crystallized from methylene chloride-ethyl acetate to give 0.220 g. of crude product of melting point 227°–228.5° C. Recrystallization of this material from ethyl acetate gave 0.142 g. of melting point 228°–229.5°; (0.053 g.) of melting point 228.5°–229.5° C. and 0.021 g. of melting point 228°–229.5° C. of 8-chloro-1-methyl-6-phenyl-4H-s-triazolo[4,3-a][1,4]benzodiazepine.

Reaction of the 5-chloro-2-[3-(chloromethyl)-5-methyl-4H-1,2,4-triazol-4-yl]benzophenone with ammonia in methanol also gave 8-chloro-1-methyl-6-phenyl-4H-s-triazolo[4,3-a][1,4]benzodiazepine, but the reaction was slower. It required more than 2 days to go to completion.

In like manner, 782 mg. (0.002 mole) of 5-chloro-2-[3-(bromomethyl-5-methyl-4H-1,2,4-triazol-4-yl]benzophenone in methylene chloride, cooled in a Dry Ice-methanol bath, gave with anhydrous ammonia 515 mg. of 8-chloro-1-methyl-6-phenyl-4H-s-triazolo[4,3-a][1,4]benzodiazepine of melting point 226°–227° C.

Other 8-substituted-1-methyl-6-phenyl-4H-s-triazolo[4,3-a][1,4]benzodiazepines can be produced from the corresponding 1,3-dihydro-7-substituted-5-phenyl-2H-1,4-benzodiazepine-2-thiones as shown in the following preparations 14-18:

PREPARATION 14

8-Chloro-1-methyl-6-(2,6-difluorophenyl)-4H-s-triazolo[4,3-a][1,4]benzodiazepine A solution of 6.0 g. (0.0186 mole) of 1,3-dihydro-7-chloro-5-(2,6-difluorophenyl)-2H-1,4-benzodiazepine-2-thione and 4.14 g. (0.0558 mole) of acetic acid hydrazide in 250 ml. of 1-butanol was heated under reflux. During the first hour a stream of nitrogen was passed through the reaction mixture to remove the hydrogen sulfide formed. The heating was continued for 18 hours in a nitrogen atmosphere. The reaction mixture was concentrated, the residue poured into water, and extracted with methylene chloride. The organic layer was dried over anhydrous sodium sulfate. Removal of the solvent gave 6.8 g. of orange solid which was recrystallized from ethanol to give in two crops 4.5 g. (70%) of 8-chloro-1-methyl-6-(2,6-difluorophenyl)-4H-s-triazolo[4,3-a][1,4]benzodiazepine of melting point 278°–279.5° C.

Anal. Calcd. for $C_{17}H_{11}ClF_2N_4$:
C, 59.22; H, 3.22; Cl, 10.28; F, 11.02; N, 16.26
Found: C, 59.41; H, 3.31; Cl, 10.32; F, 11.06; N, 16.18.

By heating the reaction mixture at lower temperature (replacing 1-butanol by ethanol) or for shorter periods of time, the open-chain intermediate, 2-(2-acetylhydrazino)-7-chloro-5-(2,6-difluorophenyl)-3H-1,4-benzodiazepine, can be isolated. This material, recrystallized from ethanol, has a melting point of 274°–277° C.

Anal. Calcd. for $C_{17}H_{13}ClF_2N_4O$:
C, 56.28; H, 3.61; Cl, 9.77; F, 10.47; N, 15.45.
Found: C, 56.02; H, 3.49; Cl, 9.78; F, 10.62; N, 15.53.

PREPARATION 15

8-Chloro-1-methyl-6-(o-fluorophenyl)-4H-s-triazolo[4,3-a][1,4]benzodiazepine A solution of 1.52 g. (0.005 mole) of 7-chloro-1,3-dihydro-5-(o-fluorophenyl)-2H-1,4-benzodiazepine-2-thione and 1.11 g. (0.015 mole) of acetic acid hydrazide in 50 ml. of 1-butanol was refluxed for 12 hours while bubbling a stream of nitrogen through the reaction mixture. The solvent was evaporated in vacuo and the residue was treated with water and methylene chloride. The phases were separated and the organic layer was dried over anhydrous sodium sulfate and concentrated to an oil. The crude oil was triturated with ethyl acetate-Skellysolve B hexanes and the resulting solid was filtered to give 1.32 g. of solid of melting point 202°–203° C. Crystallization from ethyl acetate-Skellysolve B hexanes yielded 1.13 g. (70%) of 8-chloro-1-methyl-6-(o-fluorophenyl)-4H-s-triazolo[4,3-a][1,4]benzodiazepine of melting point 203°–204° C.

Anal. Calcd. for $C_{17}H_{12}ClFN_4$:
C, 62.49; H, 3.70; Cl, 10.85; F, 5.81; N, 17.15.
Found: C, 62.39; H, 3.87; Cl, 10.91; F, 6.03; N, 17.11.

PREPARATION 16

1-Methyl-6-phenyl-8-(trifluoromethyl)-4H-s-triazolo[4,3-a][1,4]benzodiazepine A stirred mixture of 1,3-dihydro-5-phenyl-7-(trifluoromethyl)-2H-1,4-benzodiazepine-2-thione (64.9 g.; 0.204 mole), acetic acid hydrazide (45.3 g.; 0.612 mole) and methanol (2500 ml.) was refluxed under nitrogen for 24 hours. During the first two hours nitrogen was bubbled through the refluxing mixture.

The mixture was concentrated in vacuo. A suspension of the residue in water was stirred for one hour and filtered. The solid was dried at 30° C. in vacuo to give 64 g. of crude 2-(2-acetylhydrazino)-7-(trifluoromethyl)-5-phenyl-3H-1,4-benzodiazepine. This material was heated in batches of 10–20 g. at 200° C. under reduced pressure (12 mm.) until the solid had melted and bubbling had become slow. The oily product was combined and stored at 4° C. The crystalline material which resulted was collected by filtration, washed with ether and dried to give 33.4 g. of crude product. The mother liquor was chromatographed on silica gel (3 kg.) with 5% methanol-95% benzene (by volume) to give additional product. The combined product was recrystallized from wet methylene chloride-ether in two crops: 25.2 g., melting point 120.5°–127° C. of 1-methyl-6-phenyl-8-(trifluoromethyl)-4H-s-triazolo[4,3-a][1,4]benzodiazepine hydrate. The first crop had ultraviolet spectrum (ethanol) having λ max. 219 ($\epsilon$ = 13,100) and 280 m $\mu$($\epsilon$ = 3,850).

Anal. Calcd. for $C_{18}H_{13}F_3N_4$:
C, 63.15; H, 3.83; F, 16.65; N, 16.37.
Found for hydrate:
C, 59.07; H, 4.88; F, 15.90; N, 15.49; $H_2O$, 5.85.
Corrected for $H_2O$:
C, 62.73; H, 4.49; F, 16.90; N, 16.45.

Heating this product to 80° C. for a period of 72 hours at a pressure of 12 mm. Hg gave water-free 1-methyl-6-phenyl-8-(trifluoromethyl)-4H-s-triazolo[4,3-a][1,4]benzodiazepine.

PREPARATION 17

1-Methyl-8-nitro-6-phenyl-4H-s-triazolo[4,3-a][1,4]benzodiazepine

A stirred mixture of 1,3-dihydro-7-nitro-5-phenyl-2H-1,4-benzodiazepine-2-thione (2.97 g.; 0.01 mole), acetic acid hydrazide (2.21 g.; 0.03 mole) and 1-butanol (100 ml.) was refluxed for 1.5 hours with a slow stream of nitrogen bubbling through the reaction mixture. The resulting mixture was concentrated in vacuo. The residue was suspended in water and extracted with methylene chloride. The extract was dried over anhydrous potassium carbonate and concentrated in vacuo. The residue was chromatographed on silica gel (200 g.) with 2% triethylamine-3% methanol-95% ethyl acetate (by volume). The product thus obtained was crystallized from methanolethyl acetate to give 0.83 g. (26%) of 1-methyl-8-nitro-6-phenyl-4H-s-triazolo[4,3-a][1,4]benzodiazepine of melting point 233°–234° C. The analytical sample prepared by recrystallizing this material from methanol-ethyl acetate had a melting point of 231.5°–232.5° C. The ultraviolet spectrum (ethanol) had end absorption λ max. 226 ($\epsilon$ = 21,500) and 259 m$\mu$($\epsilon$ = 18,850).

Anal. Calcd. for $C_{17}N_{13}N_5O_2$:
C, 63.94; H, 4.10; N, 21.93.
Found: C, 64.05; H, 3.85; N, 21.76.

PREPARATION 18

8-Chloro-1-methyl-6-(o-chlorophenyl)-4H-s-triazolo[4,3-a][1,4]benzodiazepine

A mixture of 1.0 g. (0.0031 mole) of 7-chloro-1,3-dihydro-5-(o-chlorophenyl)-2H-1,4-benzodiazepine-2-thione, 0.8 g. (0.0108 mole) of acetic acid hydrazide and 40 ml. of 1-butanol was heated at reflux temperature under nitrogen for 24 hours. During the first 5 hours the nitrogen was slowly bubbled through the solution. After cooling and removing the solvent in vacuo, the product was well mixed with water and collected on a filter, giving 0.9 g. of orange solid of melting point 210°–212° C. This was heated under nitrogen in an oil bath at 250° C. and then cooled. The solid was crystallized from ethyl acetate, giving 0.5 g. of tan solid melting point 215° – 216° C. (dec.). This tan solid was dissolved in 25 ml. of 2-propanol, filtered, concentrated to 10 ml. and cooled, yielding 0.46 g. (43%) of tan, crystalline 8-chloro-1-methyl-6-(o-chlorophenyl)-4H-s-triazolo-[4,3-a][1,4]benzodiazepine of melting point 223°–225° C.

Anal. Calcd. for $C_{17}H_{12}Cl_2N_4$:
C, 59.49; H, 3.52; Cl, 20.66; N, 16.32
Found: C, 59.55; H, 3.78; Cl, 20.72; N, 16.24.

In the manner given in the preceding Preparations, other benzodiazepines can be produced. Representative products, thus obtained, include:

8-nitro-6-(o-chlorophenyl)-4H-s-triazolo[4,3-a][1,4]benzodiazepine;
8-trifluoromethyl-1-methyl-6-(o-chlorophenyl)-4H-s-triazolo[4,3-a][1,4]benzodiazepine;
8-nitro-1-methyl-6-(o-fluorophenyl)-4H-s-triazolo[4,3-a][1,4]benzodiazepine;
8-(trifluoromethyl)-1-methyl-6-(o-fluorophenyl)-4H-s-triazolo[4,3-a][1,4]benzodiazepine;
8-trifluoromethyl-1-methyl-6-(2,6-difluorophenyl)-4H-s-triazolo[4,3-a][1,4]benzodiazepine; and the like.

PREPARATION 19

8-Chloro-1-methyl-6-phenyl-4H-s-triazolo[4,3-a][1,4]benzodiazepine-4-carboxylic acid ethyl ester A stirred mixture of 8-chloro-1-methyl-6-phenyl-4H-s-triazolo[4,3-a][1,4]benzodiazepine (61.8 g., 0.20 mole) and diethyl carbonate (1 liter) was treated successively with sodium hydride (8.43 g. of a 57% suspension in mineral oil) and ethanol (2 ml.). It was then refluxed under nitrogen for 1.5 hours, cooled and concentrated in vacuo. The residue was treated with 1 liter of ice water which contained 0.2 mole of hydrochloric acid and extracted with methylene chloride. The extract was dried over anhydrous potassium carbonate and concentrated. The residual solid was boiled with ethyl acetate and collected by filtration. It was recrystallized from methylene chloride-ethanol to give 35.7 g. of 8-chloro-1-methyl-6-phenyl-4H-s-triazolo[4,3-a][1,4]benzodiazepine-4-carboxylic acid ester of melting point 224°–225° C. (decomposition). The analytical sample had a melting point of 223°–224° C. (decomposition).

PREPARATION 20

8-Chloro-1-methyl-6-(2,6-difluorophenyl)-4H-s-triazolo[4,3-a][1,4]benzodiazepine-4-carboxylic acid ethyl ester In the manner given in Preparation 19, a mixture of 8-chloro-1-methyl-6-(2,6-difluorophenyl)-4H-s-triazolo[4,3-a][1,4]benzodiazepine, sodium hydride and diethylcarbonate was heated to reflux to give 8-chloro-1-methyl-6-(2,6-difluorophenyl)-4H-s-triazolo[4,3-a][1,4]benzodiazepine-4-carboxylic acid ethyl ester.

PREPARATION 21

8-Chloro-1-methyl-6-(o-chlorophenyl)-4H-s-triazolo[4,3-a][1,4]benzodiazepine-4-carboxylic acid methyl ester.

In the manner given in Preparation 19, a mixture of 8-chloro-1-methyl-6-(o-chlorophenyl)-4H-s-triazolo[4,3-a][1,4]benzodiazepine, sodium hydride and dimethylcarbonate was heated to reflux to give 8-chloro-1-methyl-6-(o-chlorophenyl)-4H-s-triazolo[4,3-a][1,4]benzodiazepine-4-carboxylic acid methyl ester.

PREPARATION 22

8-nitro-1-Methyl-6-phenyl-4H-s-triazolo[4,3-a][1,4]benzodiazepine-4-carboxylic acid propyl ester In the manner given in Preparation 19, a mixture of 1-methyl-7-nitro-6-phenyl-4H-s-triazolo[4,3-a][1,4]benzodiazepine, sodium hydride and dipropylcarbonate was heated to reflux to give 1-methyl-7-nitro-6-phenyl-4H-s-triazolo[4,3-a][1,4]benzodiazepine-4-carboxylic acid propyl ester.

PREPARATION 23

8-chloro-1-methyl-6-(o-fluorophenyl)-4H-s-triazolo[4,3-a][1,4]benzodiazepine-4-carboxylic acid ethyl ester.

In the manner given in Preparation 19, a mixture of 8-chloro-1-methyl-6-(o-fluorophenyl)-4H-s-triazolo[4,3-a][1,4]benzodiazepine sodium hydride and diethylcarbonate was heated to reflux to give 8-chloro-1-methyl-6-(o-fluorophenyl)-4H-s-triazolo[4,3-a][1,4]benzodiazepine.

PREPARATION 24

8-trifluoromethyl-1-methyl-6-phenyl-4H-s-triazolo[4,3-a][1,4]benzodiazepine-4-carboxylic acid ethyl ester.

In the manner given in Preparation 19, a mixture of 8-trifluoromethyl-1-methyl-6-phenyl-4H-s-triazolo[4,3-a][1,4]benzodiazepine sodium hydride and diethylcarbonate was heated to reflux to give 8-trifluoromethyl-1-methyl-6-phenyl-4H-s-triazolo[4,3-a][1,4]benzodiazepine.

In the manner given in the preceding Preparations other 4-carboxylic acid esters of formula I are prepared such as:

8-chloro-6-phenyl-4H-s-triazolo[4,3-a][1,4]benzodiazepine-4-carboxylic acid methyl ester;

8-nitro-1-methyl-6-(o-fluorophenyl)-4H-s-triazolo[4,3-a][1,4]benzodiazepine-4-carboxylic acid ethyl ester;

8-fluoro-1-methyl-6-(o-chlorophenyl)-4H-s-triazolo-[4,3-a][1,4]benzodiazepine-4-carboxylic acid ethyl ester;

8-(trifluoromethyl)-6-(o-fluorophenyl)-4H-s-triazolo[4,3-a][1,4]benzodiazepine-4-carboxylic acid isopropyl ester;

8-trifluoromethyl-1-methyl-6-(o-chlorophenyl)-4H-s-triazolo[4,3-a][1,4]benzodiazepine-4-carboxylic acid methyl ester;

8-nitro-1-methyl-6-(o-chlorophenyl)-4H-s-triazolo[4,3-a][1,4]benzodiazepine-4-carboxylic acid methyl ester;

8-nitro-1-methyl-6-(2,6-difluorophenyl)-4H-s-triazolo[4,3-a][1,4]benzodiazepine-4-carboxylic acid ethyl ester; and the like.

EXAMPLE 1

4-Amino-8-chloro-1-methyl-6-phenyl-4H-s-triazolo[4,3-a][1,4]benzodiazepine-4-carboxylic acid ethyl ester.

An ice cold, stirred mixture of 8-chloro-1-methyl-6-phenyl-4H-s-triazolo[4,3-a][1,4]benzodiazepine-4-carboxylic acid ethyl ester (7.62 g., 0.02 mole) in dry dimethylformamide (100 ml.), under nitrogen, was treated with sodium hydride (0.92 g., 0.022 mole of a 57% suspension in mineral oil), and kept in the ice bath for 15 minutes and then at ambient temperature (about 22° to 25° C.) for 2 hours. It was then cooled in an ice bath, treated with 0-(2,4-dinitrophenyl)hydroxylamine (4.38 g., 0.022 mole) [T. Sheradsky, J. Heterocyclic Chem. 4, 413 (1967)], kept at ambient temperature for 2 hours and concentrated in vacuo. The residue was suspended in ice water, neutralized with acetic acid and extracted with methylene chloride. The extract was dried over anhydrous sodium carbonate and concentrated. The residue was crystallized from ethyl acetate-Skellysolve B hexanes to give 5.56 g. of 4-amino-8-chloro-1-methyl-6-phenyl- 4H-s-triazolo[4,3-a][1,4]benzodiazepine-4-carboxylic acid ethyl ester of melting point 192°–194° C. and 0.53 g. of melting point 191°–193° C. (77% yield). The analytical sample had a melting point of 177.5°–178° C.

Anal. calcd. for $C_{20}H_{18}ClN_5O_2$:
C, 60.68; H, 4.58; Cl, 8.96; N, 17.69.
Found: C, 60.81; H, 4.52; Cl, 8.95; N, 17.91.

EXAMPLE 2

4-Amino-8-chloro-1-methyl-6-(2,6-difluorophenyl)-4H-s-triazolo[4,3-a][1,4]benzodiazepine-4-carboxylic acid ethyl ester.

In the manner given in Example 1, 8-chloro-1-methyl-6-(2,6-difluorophenyl)-4H-s-triazolo[4,3-a][1,4]benzodiazepine-4-carboxylic acid ethyl ester was treated with potassium methoxide and then with 0-(2,4-dinitrophenyl)hydroxylamine to give 4-amino-8-chloro-1-methyl-6-(2,6-difluorophenyl)-4H-s-triazolo[4,3-a][1,4]benzodiazepine-4-carboxylic acid ethyl ester.

EXAMPLE 3

4-Amino-8-chloro-1-methyl-6-(o-chlorophenyl)-4H-s-triazolo[4,3-a][1,4]benzodiazepine-4-carboxylic acid methyl ester.

In the manner given in Example 1, 8-chloro-1-methyl-6-(o-chlorophenyl)-4H-s-triazolo[4,3-a][1,4]benzodiazepine-4-carboxylic acid methyl ester was treated with sodium hydride and then with 0-(2,4-dinitrophenyl)hydroxylamine to give 4-amino-8- chloro-1-methyl-6-(o-chlorophenyl)-4H-s-triazolo[4,3-a][1,4]benzodiazepine-4-carboxylic acid methyl ester.

EXAMPLE 4

4-Amino-8-nitro-1-methyl-6-phenyl-4H-s-triazolo[4,3-a][1,4]benzodiazepine-4-carboxylic acid propyl ester.

In the manner given in Example 1, 1-methyl-8-nitro-6-phenyl-4H-s-triazolo[4,3-a][1,4]benzodiazepine-4-carboxylic acid propyl ester was treated with potassium ethoxide and then with O-(2,4-dinitrophenyl)hydroxylamine to give 4-amino-8-nitro-1-methyl-6-phenyl-4H-s-triazolo[4,3-a][1,4]benzodiazepine-4-carboxylic acid propyl ester.

EXAMPLE 5

4-Amino-8-nitro-1-methyl-6-(o-chlorophenyl)-4H-s-triazolo[4,3-a][1,4]benzodiazepine-4-carboxylic acid methyl ester.

In the manner given in Example 1, 8-nitro-1-methyl-6-(o-chlorophenyl)-4H-s-triazolo[4,3-a][1,4]benzodiazepine-4-carboxylic acid methyl ester was treated with potassium propoxide and then with O-(2,4-dinitrophenyl)hydroxylamine to give 4-amino-8-nitro-1-methyl-6-(o-chlorophenyl)-4H-s-triazolo[4,3-a][1,4]benzodiazepine-4-carboxylic acid methyl ester.

EXAMPLE 6

4-Amino-1-methyl-8-fluoro-6-(o-chlorophenyl)-4H-s-triazolo[4,3-a][1,4]benzodiazepine-4-carboxylic acid ethyl ester.

In the manner given in Example 1, 1-methyl-8-fluoro-6-(o-chlorophenyl)-4H-s-triazolo[4,3-a][1,4]benzodiazepine-4-carboxylic acid ethyl ester was treated with sodium hydride and then with O-(2,4-dinitrophenyl)hydroxylamine to give 4-amino-1-methyl-8-fluoro-6-(o-chlorophenyl)-4H-s-triazolo[4,3-a][1,4]benzodiazepine-4-carboxylic acid ethyl ester.

EXAMPLE 7

4-Amino-8-trifluoromethyl-1-methyl-6-phenyl-4H-s-triazolo[4,3-a][1,4]benzodiazepine-4-carboxylic acid ethyl ester.

In the manner given in Example 1, 8-trifluoromethyl-1-methyl-6-phenyl-4H-s-triazolo[4,3-a][1,4]benzodiazepine-4-carboxylic acid ethyl ester was treated with sodium isopropoxide and then with O-(2,4-dinitrophenyl)hydroxylamine to give 4-amino-1-methyl-8-trifluoromethyl-6-phenyl-4H-s-triazolo[4,3-a][1,4]benzodiazepine-4-carboxylic acid ethyl ester.

EXAMPLE 8

4-Amino-8-trifluoromethyl-1-methyl-6-(o-chlorophenyl)-4H-s-triazolo[4,3-a][1,4]benzodiazepine-4-carboxylic acid methyl ester.

In the manner given in Example 1, 8-trifluoromethyl-1-methyl-6-(o-chlorophenyl)-4H-s-triazolo[4,3-a][1,4]benzodiazepine-4-carboxylic acid methyl ester was treated with potassium hydride and then with O-(2,4-dinitrophenyl)hydroxylamine to give 4-amino-8-trifluoromethyl-1-methyl-6-(o-chlorophenyl)-4H-s-triazolo[4,3-a][1,4]benzodiazepine-4-carboxylic acid methyl ester.

EXAMPLE 9

4-Amino-8-chloro-1-methyl-6-phenyl-4H-s-triazolo[4,3-a][1,4]benzodiazepine.

A stirred solution of 4-amino-8-chloro-1-methyl-6-phenyl-4H-s-triazolo[4,3-a][1,4]benzodiazepine-4-carboxylic acid ethyl ester (3.96 g., 0.01 mole) in ethanol (125 ml.) was treated with 33.6 ml. of 0.327N barium hydroxide and kept at ambient temperature for 1 hour. It was then concentrated in vacuo and the residue was dissolved in water and neutralized with 10 ml. of 1.037N sulfuric acid. The solid barium sulfate thus obtained, was collected by filtration and washed with water. The combined filtrate was concentrated in vacuo. The residue was dissolved in absolute ethanol and the solution was concentrated in vacuo. The resulting material was crystallized from methanol-ethyl acetate to give 2.04 g. of 4-amino-8-chloro-1-methyl-6-phenyl-4H-s-triazolo[4,3-a][1,4]benzodiazepine of melting point 208° C. dec.

Anal. calcd. for $C_{17}H_{14}ClN_5$:
  C, 63.06; H, 4.36; Cl, 10.95; N, 21.63.
Found: C, 62.87; H, 4.34; Cl, 10.88; N, 21.64.

EXAMPLE 10

4-Amino-8-chloro-1-methyl-6-(2,6-difluorophenyl)-4H-s-triazolo[4,3-a][1,4]benzodiazepine.

In the manner given in Example 9, 4-amino-8-chloro-1-methyl-6-(2,6-difluorophenyl)-4H-s-triazolo[4,3-a][1,4]benzodiazepine-4-carboxylic acid ethyl ester was treated with barium hydroxide and then the mixture was neutralized with sulfuric acid to give 4-amino-8-chloro-1-methyl-6-(2,6-difluorophenyl)-4H-s-triazolo[4,3-a][1,4]benzodiazepine.

EXAMPLE 11

4-Amino-8-chloro-1-methyl-6-(o-chlorophenyl)-4H-s-triazolo[4,3-a][1,4]benzodiazepine.

In the manner given in Example 9, 4-amino-8-chloro-1-methyl-6-(o-chlorophenyl)-4H-s-triazolo[4,3-a][1,4]benzodiazepine-4-carboxylic acid methyl ester was treated with barium hydroxide and then the mixture neutralized with sulfuric acid to give 4-amino-8-chloro-1-methyl-6-(o-chlorophenyl)-4H-s-triazolo[4,3-a][1,4]benzodiazepine

EXAMPLE 12

4-Amino-8-nitro-1-methyl-6-phenyl-4H-s-triazolo[4,3-a][1,4]benzodiazepine.

In the manner given in Example 9, 4-amino-8-nitro-1-methyl-6-phenyl-4H-s-triazolo[4,3-a][1,4]benzodiazepine-4-carboxylic acid propyl ester was treated with barium hydroxide and then the mixture was neutralized with sulfuric acid to give 4-amino-8-nitro-1-methyl-6-phenyl-4H-s-triazolo[4,3-a][1,4]benzodiazepine.

EXAMPLE 13

4-Amino-8-nitro-1-methyl-6-(o-chlorophenyl)-4H-s-triazolo[4,3-a][1,4]benzodiazepine.

In the manner given in Example 9, 4-amino-8-nitro-1-methyl-6-(o-chlorophenyl)-4H-s-triazolo-[4,3- a][1,4]benzodiazepine-4-carboxylic acid methyl ester was treated with barium hydroxide and then the mixture was neutralized with sulfuric acid to give 4-amino-8-nitro-1-methyl-6-(o-chlorophenyl)-4H-s-triazolo-[4,3-a][1,4]benzodiazepine.

EXAMPLE 14

4-Amino-8-fluoro-1-methyl-6-(o-chlorophenyl)-4H-s-triazolo[4,3-a][1,4]benzodiazepine.

In the manner given in Example 9, 4-amino-8-fluoro-1-methyl-6-(o-chlorophenyl)-4H-s-triazolo[4,3-a][1,4]benzodiazepine-4-carboxylic acid ethyl ester was treated with barium hydroxide and then the mixture was neutralized with sulfuric acid to give 4-amino-8-fluoro-1-methyl-6-(o-chlorophenyl)-4H-s-triazolo[4,3-a][1,4]benzodiazepine.

EXAMPLE 15

4-Amino-8-trifluoromethyl-1-methyl-6-phenyl-4H-s-triazolo[4,3-a][1,4]benzodiazepine.

In the manner given in Example 9, 4-amino-8-trifluoromethyl-1-methyl-6-phenyl-4H-s-triazolo[4,3-a][1,4]benzodiazepine-4-carboxylic acid ethyl ester was treated with barium hydroxide and then the mixture was neutralized with sulfuric acid to give 4-amino-8-trifluoromethyl-1-methyl-6-phenyl-4H-s-triazolo[4,3-a][1,4]benzodiazepine.

EXAMPLE 16

4-Amino-8-nitro-1-methyl-8-nitro-(o-chlorophenyl)-4H-s-triazolo[4,3-a][1,4]benzodiazepine.

In the manner given in Example 9, 4-amino-8-nitro-1-methyl-6-(o-chlorophenyl)-4H-s-triazolo[4,3-a][1,4]benzodiazepine-4-carboxylic acid methyl ester was treated with barium hydroxide and then the mixture was neutralized with sulfuric acid to give 4-amino-8-nitro-1-methyl-6-(o-chlorophenyl)-4H-s-triazolo[4,3-a][1,4]benzodiazepine.

EXAMPLE 17

4-Amino-8-trifluoromethyl-1-methyl-6-(o-chlorophenyl)-4H-s-triazolo[4,3-a][1,4]benzodiazepine.

In the manner given in Example 9, 4-amino-8-trifluoromethyl-1-methyl-6-(o-chlorophenyl)-4H-s-triazolo[4,3-a][1,4]benzodiazepine-4-carboxylic acid methyl ester was treated with barium hydroxyde and then the mixture was neutralized with sulfuric acid to give 4-amino-8-trifluoromethyl-1-methyl-6-(o-chlorophenyl)-4H-s-triazolo[4,3-a][1,4]benzodiazepine.

EXAMPLE 18

4-Amino-8-chloro-1-methyl-6-phenyl-6H-s-triazolo[4,3-a][1,4]benzodiazepine.

A stirred suspension of 4-amino-8-chloro-1-methyl-6-phenyl-4H-s-triazolo[4,3-a][1,4]benzodiazepine-4-carboxylic acid ethyl ester (0.792 g., 0.002 mole) in ethanol (25 ml.) was treated with 2.5 ml. of 1N sodium hydroxide and kept at ambient temperature for 1 hr. 50 min. It was then concentrated in vacuo. A solution of the residue in water was neutralized to pH 6.8 with dilute hydrochloric acid and then concentrated in vacuo. The residue was mixed with absolute ethanol and concentrated. The resulting material was extracted with chloroform. The product was mixed with absolute ethanol and concentrated. The resulting material was extracted with chloroform. The product obtained from the chloroform extract was crystallized first from methanol-ethanol and then from methanol to give 0.282 g. of 4-amino-8-chloro-1-methyl-6-phenyl-6H-s-triazolo[4,3-a][1,4]benzodiazepine of melting point 278°–279.5° C. dec.

Anal. calcd. for $C_{17}H_{14}ClN_5$:
C, 63.06; H, 4.36; Cl, 10.95; N, 21.63.
Found: C, 62.71; H, 4.44; Cl, 10.95; N, 21.30.

EXAMPLE 19

4-Amino-8-chloro-1-methyl-6-(2,6-difluorophenyl)-6H-s-triazolo[4,3-a][1,4]benzodiazepine.

In the manner given in Example 18, 4-amino-8-chloro-1-methyl-6-(2,6-difluorophenyl)-4H-s-triazolo[4,3-a][1,4]benzodiazepine-4-carboxylic acid ethyl ester was treated with 1.2N aqueous sodium hydroxide and then the mixture was neutralized with dilute hydrochloric acid to give 4-amino-8-chloro-1-methyl-6-(2,6-difluorophenyl)-6H-s-triazolo[4,3-a][1,4]benzodiazepine.

In the manner given in the preceding examples, other 4-amino-triazolobenzodiazepines can be prepared. Representative compounds thus obtained comprise:

4-amino-8-chloro-methyl-6-(o-fluorophenyl)-4H-s-triazolo[4,3-a][1,4]benzodiazepine;
4-amino-8-nitro-1-methyl-6-(o-fluorophenyl)-4H-s-triazolo[4,3-a][1,4]benzodiazepine;
4-amino-8-fluoro-1-methyl-6-(2,6-difluorophenyl)-4H-s-triazolo[4,3-a][1,4]benzodiazepine;
4-amino-8-nitro-1-methyl-6-(2,6-difluorophenyl)-4H-s-triazolo[4,3-a][1,4]benzodiazepine;
4-amino-8-trifluoromethyl-1-methyl-6-(2,6-difluorophenyl)-4H-s-triazolo[4,3-a][1,4]benzodiazepine;
4-amino-8-nitro-6-(2,6-difluorophenyl)-4H-s-triazolo[4,3-a][1,4]benzodiazepine; and the like.

Treatment of the compounds of formula IIIA with a pharmacologically acceptable acid such as hydrochloric, hydrobromic, phosphoric, sulfuric, acetic, propionic, toluenesulfonic, naphthalene-β-sulfonic, methane-sulfonic, tartaric, citric, lactic, malic, maleic, or cyclohexanesulfamic (acids) produces the pharmacologically acceptable salts of these compounds of formula IIIA. The salts can be used for the same purposes as the free base compounds of formula IIIA.

Salt formation is achieved in conventional manner by reacting the compounds of formula IV with an excess of a selected acid in a suitable medium e.g. water, alkanol, ether, or acetone, and recovering the salt by evaporating the solvent, preferably in vacuo.

I claim:
1. A 4-amino-s-triazolo[4,3-a][1,4]benzodiazepine of formula IIIa:

19

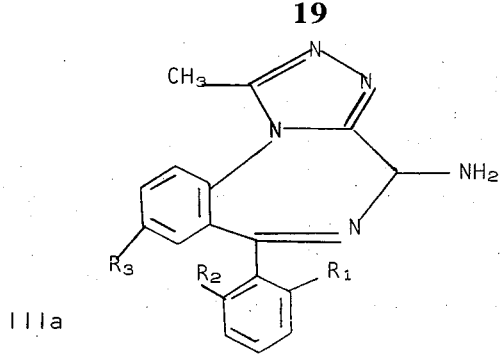

IIIa wherein $R_1$ is hydrogen, chloro or fluoro; wherein $R_2$ is hydrogen, or fluoro, with the proviso that $R_2$ is fluoro only if $R_1$ is fluoro; wherein $R_3$ is chloro, fluoro, nitro, or trifluoromethyl; and the pharmacologically acceptable acid addition salts thereof.

2. A compound according to claim 1 of the formula IIIaa:

20

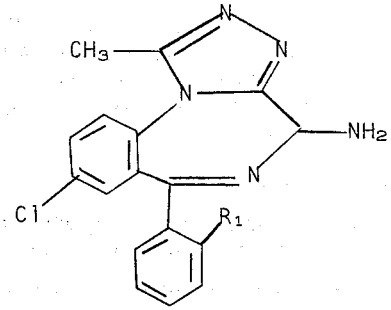

IIIaa wherein $R_1$ is hydrogen or chloro and the pharmacologically acceptable acid addition salts thereof.

3. A compound according to claim 2 wherein $R_1$ is hydrogen, and which is therefore 4-amino-8-chloro-1-methyl-6-phenyl-4H-s-triazolo[4,3-a][1,4]benzodiazepine.

4. A compound according to claim 2 wherein $R_1$ is chloro and the compound is therefore 4-amino-8-chloro-1-methyl-6-(o-chlorophenyl)-4H-s-triazolo[4,3-a][1,4]benzodiazepine.

5. A compound according to claim 1 wherein $R_1$ and $R_2$ are fluoro, and $R_3$ is chloro, and the compound is therefore 4-amino-8-chloro-1-methyl-6-(2,6-difluorophenyl)-4H-s-triazolo[4,3-a][1,4]benzodiazepine.

* * * * *